United States Patent Office 2,753,318
Patented July 3, 1956

2,753,318

NEW AQUEOUS DISPERSIONS AND PROCESS FOR MAKING AND USING THEM

Arthur Maeder, Basel, Switzerland, assignor to Ciba Limited, Basel, Switzerland, a Swiss firm No Drawing. Application April 3, 1952,
Serial No. 280,357

Claims priority, application Switzerland April 9, 1951

31 Claims. (Cl. 260—29.6)

Aqueous emulsions of thermoplastic polymers of the acrylic acid series, and copolymers thereof with other polymerizable unsaturated compounds are frequently used as coating or adhesive agents, and for the production of laminated products. The commercial usefulness of such artificial resin emulsions depends to a great extent on whether they adequately fulfil the requirements which are demanded of them by the numerous uses to which they are to be put. For example, in the manufacture of coated textiles, such as materials for rainproof garments, oiled silk or artificial leather, it is necessary to form resin films which adhere well and exhibit the best possible resistance to water. Moreover, when the aqueous emulsions are to be applied to textiles or paper by means of doctor spreading machines they must have a salve-like spreadable consistency. However, acrylic resin emulsions, which are prepared in known manner by the polymerization of the monomers in aqueous emulsions, are generally obtained in the form of thinly liquid products so that they must be thickened for use in the manner described above, and this necessitates the addition of thickening agents, for example, alkyl-celluloses, polyvinyl alcohols, tragacanth, alginates or other water-soluble highly viscous colloids. The addition of such thickening agents generally impairs the properties of the films, especially their resistance to water. Furthermore, relatively large quantities of pigments or filling agents must be added to such artificial resin emulsions to make them suitable for application, and naturally this should be possible without causing coagulation or partial flocculation. It is also necessary for the purposes referred to above that the artificial resin emulsions should be in a very highly dispersed condition and have a good stability during storage and use.

The emulsions hitherto known do not fulfil all the requirements demanded of them so that there is a need for emulsions having improved properties.

The present invention is based on the observation that new, acid, stable, aqueous dispersions of at least ternary copolymers having good properties can be made by emulsifying in an aqueous medium in the presence of an emulsifying agent at least one ester of a simple unsaturated monocarboxylic acid having a methylene group bound to the α-carbon atom and at least one nitrile of such an acid together with a small proportion of at least one free unsaturated carboxylic acid capable of being copolymerized alone or, if desired, in admixture with another polymerizable unsaturated compound free from acid groups, and bringing about polymerisation by the action of a polymerizing catalyst in the emulsion.

The invention is advantageously applied to the production of acid, thinly fluid artificial resin emulsions or dispersions, which are thickened, without the addition of thickening agents, by partial or complete neutralization with ammonia, an amine, or another substance of alkaline reaction to form salve-like or pasty masses having a high state of dispersion.

The esters of simple unsaturated monocarboxylic acids having a methylene group bound to the α-carbon atom which are used as one of the components for preparing the co-polymers correspond to the general formula

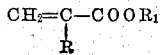

in which R represents hydrogen or a lower alkyl radical, for example, the methyl group and $R_1$ represents an alkyl, cycloalkyl, aryl, aralkyl or heterocyclic, and if desired, substituted, radical. They are therefore esters of, for example, methacrylic acid and more especially acrylic acid. Among the alcohols or phenols from which the esters may be derived there may be mentioned, for example, among those of the aliphatic series methyl, ethyl, propyl, isobutyl, 2-ethylbutyl, hexyl, heptyl, octyl and octadecyl alcohol; among those of the alicyclic series cyclohexanol and methyl-cyclohexanol; among those of the aromatic series, phenol and its nuclear substitution products, such as halogen phenols or cresols, and also naphthols; among those of the araliphatic series, benzyl alcohol; and among those of the heterocyclic series furfuryl alcohol and tetrahydrofurfuryl alcohol. Mixtures of such esters may also be used. Preferred esters of acrylic acid or methacrylic acid are those of which the polymers possess a low swelling capacity with respect to water, especially esters of high molecular weight, such as butyl, isobutyl, 2-ethylbutyl, 2-ethylhexyl, dodecyl and octadecyl acrylate, and also hexyl, heptyl, octyl and octadecyl methacrylate. The esters are either known or can be made by methods in themselves known.

The nitriles of simple unsaturated mono-carboxylic acids having a methylene group bound to the α-carbon atom correspond to the general formula

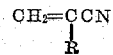

in which R represents hydrogen or a lower alkyl radical. There may be used, for example, methacrylic acid nitrile. Preferably acrylic acid nitrile is used, which can be obtained, for example, from hydrocyanic acid and acetylene in the presence of a cuprous salt catalyst.

The free unsaturated carboxylic acids capable of being copolymerized which are used in a small proportion as the third component in the manufacture of copolymers may be monocarboxylic or polycarboxylic acids, such as maleic acid, fumaric acid, itaconic acid or crotonic acid. It is of particular advantage to use simple unsaturated monocarboxylic acids having a methylene group bound to the α-carbon atom of the general formula

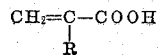

in which R represents hydrogen, halogen or a lower alkyl radical, for example, methacrylic acid, α-chloracrylic acid and especially acrylic acid. The quantities to be used are given below.

As unsaturated polymerizable compounds free from acid groups, which may if desired be admixed and polymerized with the ternary system ester-nitrile-acid, there come into consideration compounds which are themselves polymerizable and also those which cannot be polymerized alone. Among the compounds of the first group there are suitable polymerizable compounds having one or more unsaturated linkages, especially those containing the atomic grouping $CH_2=C<$, such as vinyl esters of organic acids, for example, vinyl acetate, vinyl formate, vinyl butyrate or vinyl benzoate and also vinyl alkyl ketones, vinyl halides such as vinyl chloride or vinylidene chloride; vinyl-aryl compounds such as styrene and substituted styrenes; and also compounds of the acrylic acid series which are different from esters, nitriles or acids, for example, acrylic acid amide or methacrylic acid amide, and also analogous derivatives of α-chloracrylic acid.

Among compounds which are not polymerizable by themselves there may be mentioned, for example, the esters of maleic acid, fumaric acid and crotonic acid, and also unsaturated hydrocarbons such as camphene, and also unsaturated ethers stable towards acids, such as isobornyl allyl ether or diallyl ether.

As emulsifying agents used in preparing the emulsions of the starting materials there come into consideration those which possess an adequate stability in acid media, for example, acid sulfuric acid esters of fatty alcohols, sulfonated castor oil, higher alkyl sulfonates, higher hydroxyalkyl sulfonates, and especially sodium α-hydroxyoctadecane sulfonate which is preferably free of other salts; sulfo-dicarboxylic acid esters, for example, the sodium salt of sulfo-succinic acid dioctyl ester, higher alkyl-aryl sulfonates, and also polyglycol ethers of fatty alcohols of high molecular weight, such as cetyl, oleyl or octadecyl alcohol, for example, reaction products of 15–30 molecular proportions of ethylene oxide with 1 molecular proportion of a fatty alcohol. There may also be used emulsifying agents having a pronounced wetting action, such as octyl-phenol polyglycol ether, acid sulfuric acid esters thereof, and also dodecyl alcohol polyglycol ethers. There may also be used mixtures of such emulsifying agents, or mixtures of such emulsifying agents with protective colloids, such as alginates, polyvinyl alcohols, partially hydrolyzed polyvinyl esters, proteins, starch and starch derivatives; however, it is preferable not to add such protective colloids as their presence generally considerably impairs the properties of films formed from the copolymers.

As polymerization catalysts by the action of which the polymerization takes place there may be added the usual compounds capable of catalyzing polymerizations, such as organic or inorganic peroxides or persalts, for example, peracetic acid, acetyl peroxide, benzoyl peroxide, benzoyl acetyl peroxide, lauryl peroxide, hydrogen peroxide, percarbonates, persulfates or perborates. Their addition is regulated in known manner depending on the desired course of the reaction or the properties desired in the copolymers. If desired, a plurality of agents capable of catalyzing polymerizations may be used. The action of the polymerization catalysts may be increased or may be enhanced by the simultaneous action of heat and/or actinic rays. It may even be possible to carry out the polymerization only by the action of heat and/or actinic rays without the addition of catalyzing compounds.

For producing the artificial resin emulsions of the invention the usual commercial apparatus may be used. The production of the emulsions may be carried out in two stages. In the first stage an emulsion of the starting materials is produced, which is subjected to polymerization in a second stage. As the acids to be copolymerized, for example acrylic acid or methacrylic acid are soluble in water it is possible to dissolve these acids, prior to the formation of the emulsion, in water which contains the emulsifying agent and if necessary other additions. Alternatively, these acids may be added to a previously prepared emulsion of the other components. For preparing emulsions of components sparingly soluble in water, that is to say, the nitriles and esters of the kind hereinbefore referred to, and if desired the other polymerizable compounds to be added, these components may first be mixed together and then the mixture emulsified. However, it is also possible to prepare an emulsion with one component alone and to disperse the other components in the resulting emulsion. It is also possible to prepare separate emulsions of the several components and to mix these emulsions together in suitable proportions before polymerization. Finally, the procedure may be as follows: All the components except one are emulsified in a single emulsion, and the remaining component is prepared as a separate emulsion which is added to the other emulsion only during the polymerization. This procedure is of advantage, when one of the components polymerizes more rapidly and more easily than the remaining components. Preferably, the several components are used in the monomeric state for preparing the emulsion. However, one or more of the compounds may be in a partially pre-polymerized condition. The emulsions used in the polymerization are all those of the oil-in-water type.

The polymerization may be conducted at ordinary temperature. However, it is more advantageous to conduct the polymerization at a raised temperature. There are suitable, for example, temperatures of 40–95° C., especially 55–90° C. In polymerizations considerable quantities of heat are frequently liberated, so that suitable cooling devices should be used in order to maintain the desired polymerization temperature. This is necessary when a large quantity of an emulsion is to be polymerized in one operation. In order to utilise the heat liberated and to permit of easier regulation of the polymerization temperature, it has been found advantageous to place only a small part of an emulsion to be treated in the polymerization apparatus and to allow the polymerization to commence in this portion. When the temperature in this portion of the emulsion has reached a certain value, for example 69–70° C., the remainder of the cold emulsion is run in in such manner that the temperature is maintained constant. Towards the end of the polymeration it is often necessary to supply heat externally.

As stated above, the polymerization depends on the nature and quantity of polymerization catalyst which is to be added to the emulsion usually just prior to the beginning of the polymerization. In order to be able to modify the reaction speed during the polymerization and the molecular weight of the copolymer, so-called regulators, such, for example, as mercaptans may be added.

Furthermore, it is of advantage to carry out the polymerization in the absence of air or oxygen and in the presence of an insert gas such as nitrogen or carbon dioxide. Moreover, it is possible, in addition to the aforesaid catalysts and regulators to use so-called activators. Such activators are, for example, inorganic, oxidizable sulfur compounds containing oxygen such as sulfur dioxide sodium bisulfite, sodium sulfite, ammonium bisulfite, sodium hydrosulfite or sodium thiosulfate. The simultaneous use of the aforesaid activators and polymerization catalysts yielding oxygen forms so-called Redox systems, which favorably influence the course of the polymerization. As activators there may also be used water-soluble, aliphatic tertiary amines, such as triethanolamine or diethylethanolamine. It is also possible to accelerate the action of the polymerization catalyst by the addition of a compound of a heavy metal which is capable of existing in more than one condition of valency and is present in the reduced condition, or by the addition of a complex cyanide of iron, cobalt molybdenum, mercury, zinc, copper, silver or mixtures of such complexes.

The process of the invention may be carried out continuously, but the discontinuous method is preferred.

The quantities of the individual starting compounds, which are used for making the copolymer, may vary within wide limits and depend to a great extent on the properties which are desired in the finished product. The proportion of the ester component may amount to about 1–95 per cent of the total weight of the monomers, that of the nitrile component may be about 1–80 per cent, and that of the acid component may be 0.1–10 per cent, and the proportion of the further polymerizable compound which may be added, if desired, may be up to about 20 per cent. By the use of large quantities, for example, 50–80 per cent of acrylic acid nitrile, on the one hand, and small quantities, for example 1–20 per cent of an ester of acrylic acid with an alcohol of high molecular weight, for example, acrylic acid 2-ethyl-butyl ester, on the other, there are generally obtained hard copolymers. Hard copolymers are also obtained by replacing a part of the acrylic acid nitrile by an ester of acrylic acid of an alcohol of low molecular weight, for example, acrylic acid methyl ester, or an ester of methacrylic acid with an alcohol of moderate molecular weight, for example, methacrylic acid butyl ester. If on the other hand a large proportion, for example, 50–95 per cent of an ester of acrylic acid with an alcohol of high molecular weight is polymerized with a small proportion, for example, 1–40 per cent, of acrylic acid nitrile or acrylic acid nitrile and an ester of acrylic acid or methacrylic acid with an alcohol of low molecular weight there are produced predominantly copolymers which yield soft films. The proportion of the unsaturated carboxylic acid to be copolymerised, especially acrylic acid, is generally kept low, since the resistance to swelling of the copolymer decreases as the content of copolymerised carboxylic acid increases. It amounts in general to 0.1–10 per cent, and advantageously 3-6 per cent, of the total weight of the monomers if acrylic acid is used. When other carboxylic acids are used the most adequate proportion to be added may be somewhat different from the proportion given above. The proportion of the aqueous phase depends, on the one hand, on the proportion of the unsaturated carboxylic acid to be copolymerized, especially acrylic acid, and on the proportion of the nitrile also to be copolymerized, and, on the other, on the degree of thickening which is to be produced, by neutralization of the acid artificial resin dispersion.

The dispersions of copolymers of this invention have an acid reaction and are generally thinly liquid. Dispersions of suitable concentration can be converted by complete or partial neutralization into salve-like or pasty masses. The thickening capacity depends, on the one hand, on the nature of the starting materials used for making the copolymer, and on the other, on the concentration of the dispersion. While, for example, with esters of acrylic acid of low molecular weight and acrylic acid nitrile an adequate thickening can be produced with a proportion of acrylic acid to be polymerized amounting to 4–5 per cent (calculated on the monomers introduced), and a dry content of 38-45 percent (calculated on the total weight of the emulsion), it is necessary in the case of emulsions of copolymers of esters of acrylic acid of high molecular weight and acrylic acid nitrile and 4–5 per cent of acrylic acid to adjust the dry content to 4–5 per cent or higher in order to produce an adequate thickening. An adequate thickening is one that makes the emulsion suitable as a spreadable dressing mass.

The emulsions of the copolymers may be neutralized by the addition of an aqueous solution of an alkali hydroxide or alkali carbonate, preferably, however, a concentrated aqueous solution of ammonia is used. There may also be used amines or solutions of amines in water or in inert organic solvents, especially hydrocarbons or halogen substitution products thereof, such as carbon tetrachloride, methylene chloride, benzene or toluene. There are suitable primary, secondary or tertiary amines. There may be mentioned, for example, ethylamine, dimethylamine, morpholine, pipicolenes, triethylamine and tripropylamine.

The new emulsions of copolymers are very stable when rendered either acid or alkaline and can therefore be applied either in a thinly liquid or salve-like or pasty condition. Moreover, these dispersions can be mixed with a wide range of organic or inorganic pigments or filling agents. When such pigments or filling agents are used the dispersions may be thickened after the incorporation of these additions, which facilitates the use of the emulsions and widens their range of application. It is also possible to add further modifying substances, such as plasticizers, for example, dibutyl phthalate or dioctyl phthalate, or sebacic acid esters.

The products of the invention are chiefly suitable for producing good adhering elastic coatings on fabrics of all kinds, for example, fabrics of cotton, jute, hemp, straw, artificial silk, natural silk, staple fibers of regenerated cellulose, nylon, Orlon or glass. The dispersions may if desired be thickened with ammonia and then applied by means of a doctor spreading machine to such fabrics or paper. In this manner, there can be produced by means of the new products, for example, waterproof raincoat materials, imitation wax or oilcloth, tent materials, oiled silk materials, and rear surface dressing on corduroy or carpets. Owing to their good adhesive properties these resins are also suitable as undercoatings for polyvinyl chloride coatings, for example, in the manufacture of artificial leather, and also as binding agents for coating colors applied to leather.

The new dispersions may also be used in unthickened condition in immersion processes for producing filling dressings on fabrics of all kinds. In this manner there can be made, for example, inlaid, water resistant finished materials having a soft feel, water resistant tent materials and also lining materials, which products are resistant to dry cleaning and do not become brittle. Further uses for the new products are in coloring and dressing fabrics of glass, nylon, Orlon or other artificial fibers with pigments, in adhesively uniting polyvinyl chloride foils or foils of other artificial resins, and also adhesively uniting paper foils to metal foils or paper foils or metal foils to themselves, and also in covering glass fabrics or fabrics of all kinds.

The following examples illustrate the invention, the parts being by weight unless otherwise stated and the relationship of parts by weight to parts by volume being the same as that of the kilogram to the liter:

*Example 1*

A solution of 1.6 parts of sodium α-hydroxyoctadecane sulfonate in 62 parts of distilled water is mixed with 0.2 part of triethanolamine, 0.1 part of isooctyl alcohol and 2.65 parts of acrylic acid of 100 per cent. strength. A mixture of 39.6 parts 2-ethyl-butyl-acrylate and 13.2 parts of acrylic acid nitrile is slowly run with powerful stirring into the above mixture at 20–25° C. to produce an emulsion.

One half of the resulting emulsion is heated in a polymerization vessel fitted with a reflux condenser, while stirring, and in an atmosphere of nitrogen at 65° C., and is then mixed rapidly with a solution of 0.1 part of potassium persulfate in 1 part of distilled water. When the polymerization has set in the other half of the emulsion, which has also been previously mixed with a solution of 0.1 part of potassium persulfate in 1 part of water, is run in in the course of 1 hour. The temperature rises gradually owing to the evolution of reaction heat to about 80° C. or higher. By occasional heating the temperature is prevented from falling.

When the addition of the monomeric emulsion is complete, the whole is heated slowly to 80–85° C. and is further polymerized for 2¾ hours. Finally a powerful current of nitrogen is blown into the free space in the polymerization vessel for about 5 minutes in order to remove traces of monomers, and the whole is then cooled to 30° C. There is obtained a very finely dispersed stable emulsion free from coagulate and having a dry content of 50–51 per cent., which is converted by neutralization with a concentrated aqueous solution of ammonia (about 20–25 per cent. strength) into a highly dispersed spreadable mass. The mass is especially suitable for producing coatings on textiles with a doctor spreading machine.

*Example 2*

In the manner described in Example 1, 50.16 parts of isopropyl acrylate and 2.64 parts of acrylic acid nitrile are emulsified in a solution of 1.6 parts of sodium α-hydroxyoctadecane sulfonate in 77 parts of condenser water to which 2.65 parts of acrylic acid, 0.2 part of triethanolamine and 0.1 part of isooctyl alcohol are added. One half of the resulting emulsion is mixed with 3.2 parts of carbon tetrachloride, and the whole is heated while stirring in nitrogen at 55° C. to bring about polymerization. Upon the addition of 1 part of a solution of 10 per cent. strength of potassium persulfate the polymerization sets in and after the temperature has risen to 65° C. the other half of the emulsion, also mixed with 1 part of potassium persulfate solution of 10 per cent. strength, is run in in the course of 30–40 minutes, and the whole is then stirred while gradually heating up to 75–85° C. for a further 1½–2 hours to complete the polymerization. The emulsion is then blown with nitrogen and cooled as described in Example 1.

There is obtained a completely pure stable, very finely dispersed emulsion having a content of polymer of 40–41 per cent., which can be converted into a highly dispersed pasty mass by introducing while stirring a concentrated aqueous solution of ammonia of 20–25 per cent. strength until the mixture is neutral. The mass can be applied as a dressing by means of a doctor spreading machine.

Example 3

The procedure is the same as that described in Example 2 except that 44.88 parts are used instead of 50.16 parts of isopropyl acrylate, 7.92 parts instead of 2.64 parts of acrylic acid nitrile, 72 parts instead of 77 parts of water. There is obtained a pure stable finely dispersed emulsion having a dry content of 43 per cent., which can be thickened to form a salve which spreads well by the addition of a concentrated aqueous solution of ammonia.

Example 4

By using 42.24 parts of isopropyl acrylate, 10.56 parts of acrylic acid nitrile and 65.5 parts of water instead of the quantities of these substances given in Example 2, and using the same quantities of the other reaction components given in that example, there is obtained in an analogous manner a pure stable finely dispersed emulsion having a dry content of 45 per cent., which can be converted into a highly dispersed spreadable paste by neutralization with a concentrated aqueous solution of ammonia.

Instead of aqueous solution of ammonia there may be used for the neutralization an equivalent quantity of a solution of an alkali hydroxide, or of an alkali carbonate, or an amine or a solution thereof.

Example 5

31.68 parts of 2-ethyl-hexyl acrylate and 21.12 parts of acrylic acid nitrile are emulsified in the manner described in Example 1 in a solution of 1.6 parts of sodium α-hydroxyoctadecane sulfonate in 55 parts of distilled water, to which are also added 2.65 parts of acrylic acid of 100 per cent. strength, 0.2 part of triethanolamine and 0.1 part of isooctanol. The polymerization is carried out in a manner analogous to that described in Example 1, but in the present example the period during which one half of the monomer emulsion is introduced amounts to 40–45 minutes, while the other conditions remain unaltered.

The resulting very finely dispersed emulsion is practically pure and stable and has a dry content of 50–51 per cent. Upon the addition of a concentrated aqueous solution of ammonia there is produced, as in the preceding examples, a thickened salve-like spreadable mass, which has a degree of dispersion like that of the unthickened product.

Example 6

42.24 parts of isobutyl acrylate, 5.28 parts of acrylic acid nitrile and 5.28 parts of α-phenyl-ethyl acrylate are emulsified in the manner described in Example 1 in a mixture of 1.6 parts of sodium α-hydroxyoctadecane sulfonate, 0.2 part of triethanolamine, 0.1 part of isooctanol, 2.65 parts of acrylic acid and 55 parts of water, and polymerized.

There is obtained a very fine stable suspension having a dry content of 50–51 per cent., which can be converted by neutralization with a concentrated aqueous solution of ammonia of 20–25 per cent. strength into a spreadable highly dispersed paste which is suitable for producing coatings by means of a doctor spreading machine.

In this example the α-phenyl-ethyl acrylate, while retaining the other ingredients, may be replaced by cyclohexyl acrylate, β-methyl-cyclohexyl acrylate, 1:2:3:4-tetrahydro-β-naphthyl acrylate, phenyl acrylate or tetrahydrofurfuryl acrylate. By polymerizing in the manner described above there is obtained a finely dispersed emulsion which is thickened with concentrated ammonia and is suitable for producing coatings on textiles or paper.

Example 7

A mixture of 47–52 parts of isopropyl acrylate, 2.64 parts of acrylic acid nitrile and 2.64 parts of acrylic acid amide is emulsified as described in Example 1 in a mixture of 65.5 parts of condenser water, 1.6 parts of sodium α-hydroxyoctadecane sulfonate, 2.65 parts of acrylic acid, 0.2 part of triethanolamine and 0.1 part of iso-octyl alcohol. Half of the resulting emulsion is heated to 55° C. in a polymerization apparatus under nitrogen, while stirring, and 1 part of an aqueous solution of 10 per cent. strength of potassium persulfate is added. When the polymerization has set in and the temperature has risen to 56–58° C., the remaining half of the monomer emulsion mixed with 1 part of potassium persulfate solution of 10 per cent. strength is run in in the course of 1 hour. When the addition is complete, polymerization is continued for a further 3–3½ hours at a temperature of 80–83° C. and the further treatment is as described in Example 1.

There is obtained a thinly fluid, stable, finely dispersed, practically pure artificial resin emulsion having a dry content of 45 per cent., which can be thickened to a spreadable consistency by neutralization with a concentrated aqueous ammonia solution.

Example 8

The procedure is the same as that described in Example 7, except that the isopropyl acrylate is replaced by the same quantity of isobutyl acrylate, and only 55 parts, instead of 65.5 parts, of condenser water are used. In this manner there is obtained a pure, finely dispersed, stable emulsion having a dry content of 50–51 per cent. which can be thickened to form a highly dispersed very readily spreadable mass by neutralization or by being rendered slightly alkaline by means of concentrated ammonia solution of 20–25 per cent. strength. The thickened mass is suitable for coating textiles.

Example 9

A mixture of 44.88 parts of isobutyl acrylate, 7.92 parts of acrylic acid nitrile and 2.64 parts of camphene is emulsified in the manner described in Example 1 in 58 parts of condenser water to which have been added 1.6 parts of sodium α-hydroxyoctadecane sulfonate, 0.2 part of triethanolamine, 2.65 parts of acrylic acid and 0.1 part of isooctanol. The polymerization is commenced in half of the resulting emulsion by the addition of 1 part of potassium persulfate solution of 10 per cent. strength after heating to 63–65° C. under nitrogen, while stirring, and then at 70° C. the remaining half of the emulsion is run in in the course of 2 hours. When the addition is complete, a solution of 0.1 part of benzoyl peroxide in 0.8 part of benzene is rapidly added, and polymerization is continued for a further 4 hours at 80–85° C. After blowing nitrogen through the finished polymerized emulsion in the usual manner, the emulsion is cooled to room temperature.

The pure finely dispersed emulsion of the copolymer is stable and has a dry content of about 50 per cent. By neutralizing with a concentrated aqueous ammonia solution there is produced a highly dispersed spreadable mass, which is excellently suited for coating textiles or glass fabrics.

Example 10

51.75 parts of isopropyl acrylate, 0.52 part of allyl acrylate and 0.52 part of acrylic acid nitrile are emulsified in the manner described in Example 1 in a solution of 1.6 parts of sodium α-hydroxyoctadecane sulfonate in 60 parts of condenser water, to which 2.65 parts of acrylic acid, 0.2 part of triethanolamine and 0.1 part of isooctanol have been added. To bring about polymerization half of the resulting emulsion is heated in an atmosphere of nitrogen, while stirring, to 57–58° C., and mixed with 1 part of aqueous potassium persulfate solution of 10 per cent strength. After raising the temperature to 64° C. the remaining half of the emulsion mixed with 1 part of aqueous potassium persulfate solution of 10 per cent strength is run in in the course of 1 hour, and polymerization is continued for a further 3 hours at 83–85° C. Nitrogen is blown through the emulsion as described in Example 1 and cooled.

The finely dispersed thinly liquid emulsion is stable and has a dry content of 48–50 per cent. By stirring in a concentrated aqueous solution of ammonia to bring about neutralization the artificial resin emulsion is thickened to a highly dispersed mass having a spreadable consistency, which is suitable for producing coatings or as an adhesive agent.

Example 11

42.24 parts of isopropyl acrylate, 5.28 parts of isobornyl allyl ether and 5.28 parts of acrylic acid nitrile are emulsified in the manner described in Example 1 in a solution of 1.6 parts of sodium α-hydroxyoctadecane sulfonate in 75 parts of distilled water to which 2.65 parts of acrylic acid, 0.2 part of triethanolamine and 0.1 part of isooctanol have been added. Polymerization is carried out as described in Example 1, the polymerization being continued, after the addition of the emulsified monomers is complete, for 3¼–3½ hours at 85–88° C.

The resulting emulsion is thinly liquid, finely dispersed, pure and stable, and is converted as described in the foregoing examples, by the addition of concentrated ammonia solution to bring about neutralization, into a highly dispersed spreadable mass which is suitable for producing coatings by means of a doctor spreading machine.

Example 12

46.93 parts of isopropyl acrylate and 5.87 parts of acrylic nitrile are emulsified in the manner described in Example 1 in a solution of 1.6 parts of sodium α-hydroxyoctadecane sulfonate in 75 parts of water to which there have been added 2.65 parts of methacrylic acid, 0.2 part of triethanolamine and 0.1 part of isooctanol. To bring about polymerization half of the resulting emulsion is heated in an atmosphere of nitrogen, while stirring, to 65–68° C., and mixed with 0.5 part of aqueous potassium persulfate solution of 10 per cent strength. After raising the temperature to 75° C. the remaining half of the emulsion mixed with 1.5 parts of aqueous potassium persulfate solution of 10 per cent strength is run in in the course of 1 hour, and polymerization is continued for a further 3 hours at 81–85° C. Nitrogen is blown through the emulsion as described in Example 1 and cooled. The finely dispersed thinly liquid emulsion is stable and has a dry content of 46–47 per cent. By stirring in a concentrated aqueous solution of ammonia to bring about neutralization the emulsion is thickened to a highly dispersed mass having a spreadable consistency, which is suitable for producing coatings.

Example 13

A mixture of 36.96 parts of laurylmethacrylate and 15.84 parts of acrylic nitrile is emulsified in the manner described in Example 1 in 60 parts of water to which have been added 1.6 parts of sodium α-hydroxyoctadecane sulfonate, 0.2 part of triethanolamine, 2.65 parts of acrylic acid and 0.1 part of isooctanol. The polymerization is commenced in half of the resulting emulsion by the addition of 1 part of potassium persulfate solution of 10 per cent strength after heating to 70° C. under nitrogen, while stirring, and then at 74–76° C. the remaining half of the emulsion is run in the course of 1½ hours. When the addition is complete, polymerization is continued for a further 2½ hours at 83–85° C. After blowing nitrogen through the finished polymerized emulsion the latter is cooled to room temperature.

The finely dispersed emulsion of the copolymer is stable and has a dry content of 46–47 per cent. By neutralizing with a concentrated aqueous ammonia solution there is produced a highly dispersed spreadable mass, which is excellently suited for coating textiles or paper.

Example 14

47.52 parts of isobutylacrylate, 5.28 parts of acrylic nitrile are emulsified in the manner described in Example 1 in a solution of 1.2 parts of sodium α-hydroxyoctadecane sulfonate in 54 parts of water to which 2.65 parts of maleic acid, 0.2 part of triethanolamine and 0.1 part of isooctanol have been added. Polymerization is carried out as described in Example 1, the polymerization being continued, after the addition of the emulsified monomers is complete, for 4 hours at 80–85° C.

Instead of maleic acid there may also be used crotonic acid.

Thinly liquid stable emulsions are obtained which are suitable for dressing textiles.

Example 15

In order to produce imitation wax cloth on the basis of an acrylic resin, a cotton fabric is coated three times on a doctor spreading machine with the dispersion prepared as described in Example 6 and thickened with concentrated aqueous ammonia solution of 20–25 per cent strength, and the material is then dried at 80–100° C. In order to remove a slight stickiness a thin coating of a suitable nitro cellulose lacquer is applied thereto, and the material is finally calendered at a raised temperature.

Example 16

For producing an imitation wax cloth on the basis of polyvinyl chloride, a cotton fabric is grounded to prevent the penetration to the underside of the cloth of the polyvinyl chloride layer during gelatinisation at a raised temperature, on a doctor spreading machine with two coatings of the emulsion produced as described in Example 2 and thickened with concentrated aqueous ammonia solution to a spreadable consistency. The grounded side of the cloth is then coated in known manner with a paste produced from polyvinyl chloride and a plasticiser, for example, 60 per cent. of polyvinyl chloride and 40 per cent. of a mixture of 2 parts of dibutyl phthalate and 1 part of tricresyl phosphate, and the coating is gelatinized for about 5 minutes at about 150–160° C.

Example 17

Coloring glass fabrics with pigments:

Any desired glass fabric is foularded with a mixture, colored with finely divided pigment, of 2 parts of the unthickened dispersion produced as described in Example 1 and 1 part of water. The fabric is then squeezed, dried and subsequently heated for 10 minutes at 125° C. or for 5 minutes at 140° C. The glass fabric so treated has a good adherent water-resistant coloring.

Example 18

Dressing fabrics:

A fabric of viscose staple fibers is dressed on a foulard with a mixture of 5 parts of the unthickened dispersion produced as described in Example 3 and 100 parts of water, and the fabric is pressed, and rapidly dried at 80–100° C. By this treatment a water-resistant permanent dressing is produced which withstands washing many times at the boil, and imparts to the fabric a full slightly stiffened feel.

What is claimed is:

1. A process for the manufacture of an acid, stable aqueous dispersion for at least ternary copolymers, which comprises emulsifying, as sole monomers, at least one ester of a simple unsaturated monocarboxylic acid containing a methylene group bound to the α-carbon atom, and at least one nitrile of such an acid together with a small proportion of at least one free unsaturated copolymerisable monocarboxylic acid in an aqueous medium in the presence of an emulsifying agent, and bringing about polymerization by the action of a polymerization catalyst in the emulsion.

2. A process for the manufacture of an acid, stable aqueous dispersion of at least ternary copolymers, which comprises emulsifying, as sole monomers, at least one ester of a simple unsaturated monocarboxylic acid containing a methylene group bound to the α-carbon atom, and at least one nitrile of such an acid together with a small proportion of a free acid of the aforesaid kind in an aqueous medium in the presence of an emulsifying agent, and bringing about polymerization by the action of a polymerization catalyst in the emulsion.

3. A process for the manufacture of an acid, stable aqueous dispersion of at least ternary copolymers, which comprises emulsifying, as sole monomers, at least one ester of a simple unsaturated monocarboxylic acid containing a methylene group bound to the α-carbon atom, and at least one nitrile of such an acid together with a small proportion of acrylic acid in an aqueous medium in the presence of an emulsifying agent, and bringing about polymerization by the action of a polymerization catalyst in the emulsion.

4. A process for the manufacture of an acid, stable aqueous dispersion of at least ternary copolymers, which comprises emulsifying, as sole monomers, at least one ester of a simple unsaturated monocarboxylic acid containing a methylene group bound to the α-carbon atom, and acrylic acid nitrile together with a small proportion of acrylic acid in an aqueous medium in the presence of an emulsifying agent, and bringing about polymerization by the action of a polymerization catalyst in the emulsion.

5. A process for the manufacture of an acid, stable aqueous dispersion of at least ternary copolymers, which comprises emulsifying, as sole monomers, at least one acrylic acid ester, and acrylic acid nitrile together with a small proportion of acrylic acid in an aqueous medium in the presence of an emulsifying agent, and bringing about polymerization by the action of a polymerization catalyst in the emulsion.

6. A process for the manufacture of an acid, stable aqueous dispersion of copolymers, which comprises emulsifying acrylic acid isopropyl ester, and acrylic acid nitrile together with a small proportion of acrylic acid in an aqueous medium in the presence of an emulsifying agent, and bringing about polymerization by the action of a polymerization catalyst in the emulsion.

7. A process for the manufacture of an acid, stable aqueous dispersion of copolymers, which comprises emulsifying acrylic acid isobutylester, acrylic acid nitrile together with a small proportion of acrylic acid in an aqueous medium in the presence of an emulsifying agent, and bringing about polymerization by the action of a polymerization catalyst in the emulsion.

8. A process for the manufacture of an acid, stable aqueous dispersion of copolymers, which comprises emulsifying acrylic acid 2-ethyl-butylester, and acrylic acid nitrile together with a small proportion of acrylic acid in an aqueous medium in the presence of an emulsifying agent, and bringing about polymerization by the action of a polymerization catalyst in the emulsion.

9. A process for the manufacture of an acid, stable aqueous dispersion of copolymers, which comprises emulsifying, as sole monomers, at least one ester of a simple unsaturated monocarboxylic acid containing a methylene group bound to the α-carbon atom, and at least one nitrile of such an acid together with a small proportion of at least one free unsaturated copolymerizable monocarboxylic acid and with another polymerizable unsaturated compound free from acid groups and aromatic rings, in an aqueous medium in the presence of an emulsifying agent, and bringing about polymerization by the action of a polymerization catalyst in the emulsion.

10. A process for the manufacture of an acid, stable aqueous dispersion of copolymers, which comprises emulsifying, as sole monomers, at least one ester of a simple unsaturated monocarboxylic acid containing a methylene group bound to the α-carbon atom, and at least one nitrile of such an acid together with a small proportion of at least one free unsaturated copolymerizable monocarboxylic acid and with another polymerizable unsaturated compound free from acid groups and aromatic rings which compound is not polymerizable by itself, in an aqueous medium in the presence of an emulsifying agent, and bringing about polymerization by the action of a polymerization catalyst in the emulsion.

11. A process for the manufacture of an acid, stable aqueous dispersion of copolymers, which comprises emulsifying acrylic acid isopropyl ester, and acrylic acid nitrile together with a small proportion of acrylic acid and with camphene in an aqueous medium in the presence of an emulsifying agent, and bringing about polymerization by the action of a polymerization catalyst in the emulsion.

12. A process for the manufacture of an acid, stable aqueous dispersion of at least ternary copolymers, which comprises emulsifying, as sole monomers, at least one ester of a simple unsaturated monocarboxylic acid containing a methylene group bound to the α-carbon atom, and at least one nitrile of such an acid together with a small proportion of at least one free unsaturated copolymerizable monocarboxylic acid in an aqueous medium containing as a polymerization activator a water soluble aliphatic tertiary amine in the presence of a salt of α-hydroxyoctadecane sulfonic acid as emulsifying agent, and bringing about polymerization in the emulsion, by the action of a per-salt as polymerization catalyst, the polymerization being conducted at a raised temperature in the absence of oxygen.

13. A process for the manufacture of an acid, stable aqueous dispersion of at least ternary copolymers, which comprises emulsifying, as sole monomers, at least one ester of a simple unsaturated monocarboxylic acid containing a methylene group bound to the α-carbon atom, and at least one nitrile of such an acid together with a small proportion of at least one free unsaturated copolymerizable monocarboxylic acid in an aqueous medium containing as a polymerization activator triethanolamine in the presence of the sodium salt of α-hydroxyoctadecane sulfonic acid which is free from other salts as an emulsifying agent, and bringing about polymerization in the emulsion by the action of potassium per-sulfate as polymerization catalyst, the polymerization being conducted at 50–90° C. in an atmosphere of nitrogen.

14. A process for the manufacture of an acid stable aqueous dispersion of ternary copolymers having a dry content of about 50 per cent, which comprises emulsifying 75–80 parts of acrylic acid 2-ethyl-butyl ester, 15–20 parts of acrylic acid nitrile and 3–5 parts of acrylic acid in 100 parts of water containing as a polymerization activator triethanolamine in the presence of the sodium salt of α-hydroxyoctadecane sulfonic acid which is free from other salts as an emulsifying agent, and bringing about polymerization in the emulsion by the action of potassium per-sulfate as polymerization catalyst, the polymerization being conducted at 50–90° C. in an atmosphere of nitrogen, and initiated in a part of the monomeric emulsion and the remaining part of the monomeric emulsion being introduced during the polymerization.

15. A process for the manufacture of an acid stable aqueous dispersion of ternary copolymers having a dry content of about 50 per cent, which comprises emulsifying 80–90 parts of acrylic acid isobutyl ester, 5–15 parts of acrylic acid nitrile and 4–5 parts of acrylic acid in 100 parts of water containing as a polymerization activator triethanolamine in the presence of the sodium salt of α-hydroxyoctadecane sulfonic acid which is free from other salts as an emulsifying agent, and bringing about polymerization in the emulsion by the action of potassium per-sulfate as polymerization catalyst, the polymerization being conducted at 50–90° C. in an atmosphere of nitrogen and initiated in a part of the monomeric emulsion and the remaining part of the monomeric emulsion being introduced during the polymerization.

16. A process for the production of an acid, stable aqueous dispersion of copolymers having a dry content of about 40 per cent, which comprises emulsifying 70–80 parts of acrylic acid isopropyl ester, 5–15 parts of acrylic acid nitrile, and 5–10 parts of camphene and 4–5 parts of acrylic acid in 150 parts of water containing as a polymerization activator triethanolamine in the presence of the sodium salt of α-hydroxyoctadecane sulfonic acid which is free from other salts as an emulsifying agent, and bringing about polymerization in the emulsion by the action of potassium persulfate as polymerization catalyst, the polymerization being conducted at 50–90° C. in an atmosphere of nitrogen and initiated in a part of the monomeric emulsion and the remaining part of the monomeric emulsion being introduced during the polymerization.

17. An acid, aqueous, stable dispersion of at least ternary copolymers which comprises a copolymer containing, as sole constituents, at least one ester of a simple unsaturated monocarboxylic acid containing a methylene group bound to the α-carbon atom, at least one nitrile of such an acid and of a small proportion of at least one free unsaturated copolymerizable monocarboxylic acid.

18. An acid, aqueous, stable dispersion of at least ternary copolymers which comprises a copolymer containing, as sole constituents, at least one ester of a simple unsaturated monocarboxylic acid containing a methylene group bound to the α-carbon atom, at least one nitrile of such an acid and of a small proportion of at least one free acid of the aforesaid kind.

19. An acid, aqueous, stable dispersion of at least ternary copolymers which comprises a copolymer containing as sole constituents, at least one ester of a simple unsaturated monocarboxylic acid containing a methylene group bound to the α-carbon atom, at least one nitrile of such an acid and of a small proportion of acrylic acid.

20. An acid, aqueous, stable dispersion of at least ternary copolymers which comprises a copolymer containing, as sole constituents, at least one ester of a simple unsaturated monocarboxylic acid containing a methylene group bound to the α-carbon atom, acrylic acid nitrile and of a small proportion of acrylic acid.

21. An acid, aqueous, stable dispersion of at least ternary copolymers which comprises a coploymer containing, as sole constituents, at least one acrylic acid ester, acrylic acid nitrile and of a small proportion of acrylic acid.

22. An acid, aqueous, stable dispersion of copolymers which comprises a copolymer of acrylic acid isopropyl ester, acrylic acid nitrile and of a small proportion of acrylic acid.

23. An acid, aqueous, stable dispersion of copolymers which comprises a copolymer of acrylic acid isobutyl ester, acrylic acid nitrile and of a small proportion of acrylic acid.

24. An acid, aqueous, stable dispersion of copolymers which comprises a copolymer of acrylic acid 2-ethyl-butyl ester, acrylic acid nitrile and of a small proportion of acrylic acid.

25. An acid, aqueous, stable dispersion of copolymers which comprises a copolymer containing, as sole constituents, at least one ester of a simple unsaturated monocarboxylic acid containing a methylene group bound to the α-carbon atom, at least one nitrile of such an acid, a small proportion of at least one free unsaturated copolymerizable monocarboxylic acid and of another polymerizable unsaturated compound free from acid groups and aromatic rings.

26. An acid, aqueous, stable dispersion of copolymers which comprises a coyolymer containing, as sole constituents, at least one ester of a simple unsaturated monocarboxylic acid containing a methylene group bound to the α-carbon atom, at least one nitrile of such an acid, a small proportion of at least one free unsaturated copolymerizable monocarboxylic acid and of another polymerizable unsaturated compound free from acid groups and aromatic rings which compound is not polymerizable by itself.

27. An acid, aqueous, stable dispersion of a ternary copolymer with a dry content of about 50 per cent of a copolymer of 75–80 parts of acrylic acid 2-ethylbutyl ester, 15–20 parts of acrylic acid nitrile and 3–5 parts of acrylic acid.

28. An acid, aqueous, stable dispersion of a ternary copolymer with a dry content of about 50 per cent of a copolymer of 80–90 parts of acrylic acid isobutyl ester, 5–15 parts of acrylic acid nitrile and 4–5 parts of acrylic acid.

29. An acid, aqueous, stable dispersion of copolymer with a dry content of about 40 per cent of a copolymer of 70–80 parts of acrylic acid isopropyl ester, 5–15 parts of acrylic acid nitrile, 5–10 parts of camphene and 4–5 parts of acrylic acid.

30. An acid, aqueous, stable dispersion of a ternary copolymer with a dry content of about 50 per cent of a copolymer of 80–90 parts of acrylic acid isobutyl ester, 5–15 parts of acrylic acid nitrile and 4–5 parts of acrylic acid, which dispersion is thickened by neutralization with aqueous ammonia.

31. An acid, aqueous, stable dispersion of a copolymer with a dry content of about 40 per cent of a copolymer of 70–80 parts of acrylic acid isopropyl ester, 5–15 parts of acrylic acid nitrile, 5–10 parts of camphene and 4–5 parts of acrylic acid, which dispersion is thickened by neutralization with aqueous ammonia.

References Cited in the file of this patent

UNITED STATES PATENTS

| | | |
|---|---|---|
| 1,981,102 | Hagedorn et al. | Nov. 20, 1934 |
| 2,436,926 | Jacobson | Mar. 2, 1948 |
| 2,446,049 | Kropa | July 27, 1948 |